H. P. TOWNSEND.
THREADING ATTACHMENT.
APPLICATION FILED AUG. 26, 1916.
1,317,245.
Patented Sept. 30, 1919.
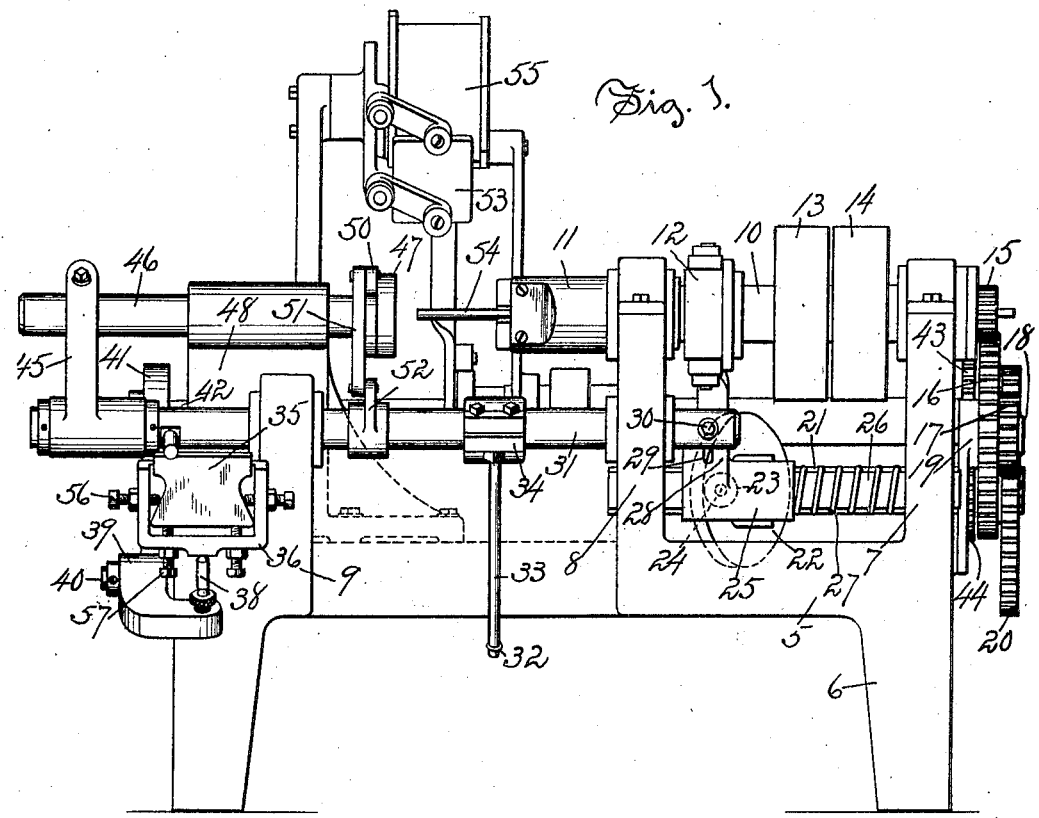
Fig. 1.
Fig. 3.
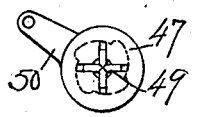
Fig. 2.
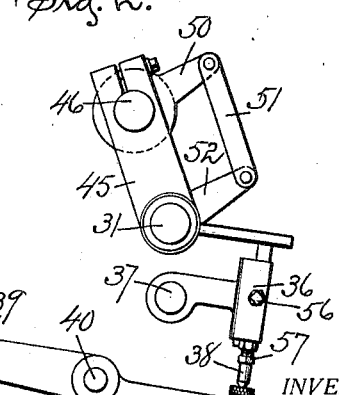
WITNESSES:
INVENTOR.
Harry P. Townsend,
BY Arthur B. Jenkins,
ATTORNEY.

UNITED STATES PATENT OFFICE.

HARRY P. TOWNSEND, OF HARTFORD, CONNECTICUT, ASSIGNOR TO THE H. P. TOWNSEND MANUFACTURING COMPANY, OF HARTFORD, CONNECTICUT, A CORPORATION OF CONNECTICUT.

THREADING ATTACHMENT.

1,317,245.      Specification of Letters Patent.      Patented Sept. 30, 1919.

Application filed August 26, 1916. Serial No. 117,077.

*To all whom it may concern:*

Be it known that I, HARRY P. TOWNSEND, a citizen of the United States, and a resident of Hartford, in the county of Hartford and State of Connecticut, have invented a new and Improved Threading Attachment, of which the following is a specification.

My invention relates to machines for making threads upon metallic articles, and an object of my invention, among others, is to provide a threading attachment that shall be extremely simple and effective in its operation and that may also utilize in its make-up parts of the machine employed for other purposes.

One form of device embodying my invention and in the construction and use of which the objects herein set out, as well as others, may be attained, is illustrated in the accompanying drawings, in which—

Figure 1 is a view in front elevation of a machine embodying my invention.

Fig. 2 is a detail view illustrating the relative arrangement of the parts comprising my improved threading attachment and as viewed from the end of the machine.

Fig. 3 is a detail view illustrating the construction and operation of a threading die.

In the accompanying drawings the numeral 5 indicates the bed or base of a machine that may be supported upon legs 6 and that has uprights 7—8—9 for supporting operative parts of the machine. A spindle 10 is rotatably mounted in the uprights 7 and 8, this spindle having a chuck 11 of any ordinary construction operated as by means of a collar 12 borne in the end of a forked lever in an ordinary manner, said spindle being driven as by means of one of the pulleys 13—14 which is fast to the spindle, the other pulley being a common form of loose pulley.

A pinion 15 secured to the spindle meshes with a gear 16 rigidly connected with a pinion 17, both of which are mounted on a stud 18 projecting from an arm 19 at or near one end and pivotally mounted at its opposite end on a stud projecting from the end of the machine frame. The pinion 17 meshes with a gear 20 secured to a threading cam shaft 21 mounted in the frame of the machine, as in the uprights 7 and 8 and having a threading cam 22 engaging with a roller 23 on the end of a pin 24 projecting from the side of a threading arm operating sleeve 25. This sleeve is mounted for reciprocating movement on a supporting rod 26 secured in the uprights 7 and 8, said sleeve being forced in one direction by a spring 27. An arm 28 projects from one side of the sleeve and has a slot 29 that receives a pin 30 projecting from the side of a tool bar or threading die operating bar 31 mounted for sliding and rotary reciprocating movements in the uprights 8 and 9.

This bar is moved to one position in a rotary manner as by means of a spring 32 secured at one end to the frame of the machine and at the other end to a rod 33 projecting from a block 34 secured to the bar. Said bar is moved in the opposite direction by means of a shoe 35 adjustably mounted in a frame 36 supported on a stud 37 projecting from the frame of the machine. The lower edge of this frame rests against an adjustable post 38 supported by a die operating lever 39 pivotally supported on the end of the frame, as by a stud 40, the end of the lever opposite the post 38 being in contact with a die opening and closing cam 41 secured to a cam shaft 42 mounted in the frame of the machine, which shaft operates other members of the machine and is driven as by means of a gear 43 meshing with a gear 44 secured to the cam shaft 21.

A threading arm 45 is loosely mounted on the end of the bar 31 and is adjustably attached to the shank 46 of a threading die 47 mounted in a bracket 48 rising from the bed of the machine. This threading die may be of any well known form and construction, it being briefly stated that it has jaws 49 that are formed to cut a thread, these jaws being opened and closed in any suitable manner, a jaw operating lever 50 being employed in this operation. This lever is connected by a link 51 with a jaw operating arm 52 rigidly secured to the die operating bar 31.

The numeral 53 indicates generally a feed mechanism by means of which blanks 54 are removed from a hopper 55 and inserted in the chuck. This feed mechanism may be of any well known form and construction and further and detailed description is, therefore, omitted herein.

The shoe 35 may be adjusted in its position in the frame 36 as by means of adjusting screws 56—57, the former to determine the position of the shoe horizontally and the latter its vertical arrangement. The shoe may have its upper edge inclined, if desired, so that a lengthwise movement of the bar 31 will impart a rotary movement thereto, which through the connections 52—51 will operate the die opening and closing members to such extent as may be desired, and for any purpose that may be wished, as for cutting a tapered thread, or for placing the dies in position to be quickly actuated as by means of the lever 39.

It will be noted that the threading cam shaft has a geared connection with the spindle 10 and the degree of inclination of the thread on the blank 54 will, therefore, depend upon the obliquity of the cam 25 and its rate of rotation as compared with the rate of rotation of the chuck 11.

The attachment is applied to a machine that may be used for many other purposes, in one embodiment of the machine the bar 31 being employed to support and actuate a cutting tool, and my improved threading attachment requiring to be added to the machine simply the threading die with its shank, the threading arm 45 and the jaw operating arm 52 with its connections.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means within the scope of the appended claims.

It will be noted that the tool bar and threading die are so connected that both a longitudinal and rocking movement may be imparted to the die by the tool bar and these two movements may be simultaneous or separate or partially simultaneous and partially separate, and the rocking movement may be faster at times than at others.

I claim—

1. In combination with the tool bar of a metal working machine, means for reciprocating said bar lengthwise, means for rocking the bar, a threading die, means connecting the tool bar and threading die to impart movement in an axial direction to the latter, and means connecting said tool bar and threading die for operating the die parts.

2. In combination with the tool bar of a metal working machine, a threading die, an arm loosely mounted on said tool bar and rigidly connected with said die to impart movement thereto in an axial direction, means connecting said tool bar and die for operating the die parts, means for moving said tool bar in an axial direction, and means for rocking it.

3. In combination with the tool bar of a metal working machine, a threading die mounted with its axis parallel to that of said bar, means for moving said bar in an axial direction, means for rocking it, a connection between said bar and threading die to move the latter in the direction of its axis, and a connection between said bar and threading die to operate the die parts.

4. In combination with the tool bar of a metal working machine, a spindle having means to receive a blank, means for moving the tool bar in a longitudinal direction, a positive driving connection between said spindle and the means for moving the tool bar longitudinally, a threading die, and connections between the tool bar and threading die to move the latter longitudinally and to rock it.

5. In combination with the tool bar of a metal working machine, a spindle having means to receive a blank, means for moving the tool bar in a longitudinal direction, a geared connection between said spindle and means for so moving the tool bar longitudinally, a threading die mounted for longitudinal movement, an arm connecting the tool bar and threading die to impart longitudinal movement to the latter, means for rocking the tool bar, and a connection between said tool bar and threading die for operating parts of the latter.

6. In combination with the tool bar of a metal working machine and with means for imparting longitudinal movement thereto and with means for rocking it, a threading die mounted for longitudinal movement, an arm loosely mounted on the tool bar and connected with the die to impart longitudinal movement thereto, a second arm extending from the tool bar, and a connection between said second arm and threading die for operating the parts of the latter.

7. In combination with the tool bar of a metal working machine, an operating sleeve, means for imparting longitudinal movement to said sleeve, means connecting said bar and sleeve to cause longitudinal movement of the former but to permit rotative movement thereof independently of said sleeve, a threading die, and means connecting said tool bar and threading die to impart longitudinal movement to the latter and to operate its die parts.

8. In combination with the tool bar of a metal working machine, an operating sleeve, means for imparting longitudinal movement to said sleeve, an arm extending from said sleeve and having a slot, a pin projecting from said bar into said slot, a threading die, and connections between said bar and die for imparting longitudinal movement to the latter and for operating its die parts.

9. In combination with the tool bar of a metal working machine and with means for rocking said tool bar and for imparting longitudinal movement thereto, a threading die, and connections between said tool bar and threading die for imparting longitudinal movement to the latter and for operating its die parts.

10. In combination with the tool bar of a metal working machine and with means for imparting longitudinal movement thereto and also with means for rocking it, said latter means including a shoe having means for changing the position of its edge, a threading die, and connections between said tool bar and threading die for imparting longitudinal movement to the latter and for rocking it.

11. In combination with the tool bar of a metal working machine including means for moving it longitudinally and means for rocking it, a threading die removably mounted in the machine, an arm removably attached to the bar and connected with the threading die to operate it, and an arm removably attached to said bar and connected with said die to operate its die parts.

12. In combination with the tool bar of a metal working machine including means for moving it longitudinally and means for rocking it, a threading die having a shank removably mounted in the frame of said machine, a sleeve loosely mounted on said bar against longitudinal movement thereon and having an arm extending therefrom and adjustably secured to said shank, and connections between said bar and threading die to operate the parts of the latter.

13. In combination with the tool bar of a metal working machine including means for moving it longitudinally and means for rocking it, the latter including a shoe having means to change the position of its operating edge, a threading die having a shank removably mounted in the frame of said machine, a sleeve removably and loosely mounted on said tool bar against longitudinal movement thereon, an arm projecting from said sleeve and adjustably attached to said shank, an arm removably attached to said bar, and connections between said die and last mentioned arm to effect operation of the die parts.

14. A threading die with die members, a bar, means for operating said bar, and means connecting said bar and threading die to simultaneously impart longitudinal movement to said die and to operate its die members.

15. A threading die with die members, a tool bar, means for operating the tool bar, and means connecting the tool bar and threading die to impart longitudinal movement to said die and to operate its die members.

16. A threading die with die members, a die operating member connected with said threading die, and means including different sets of members for actuating said operating member, one set to open and close the die parts and another set to effect another operation of said die.

17. A threading die with die members, a die operating member, means for moving the die operating member longitudinally and for rocking it, an operative connection between said die operating member and threading die, and means including different sets of members for actuating said die operating member to operate said die.

18. A threading die with die members, a movably mounted die operating member connected with said threading die, and means including different sets of members, one set to move the dies longitudinally and the other set to impart another operation to said die members.

19. A threading die with die members, a die operating member connected with said threading die, and means for actuating said die operating member to open and close the members of the threading die and to impart movements to said die longitudinally of its shank.

20. A threading die including die members, a tool bar provided with means to receive a tool, means for operating the tool bar, and means connecting the tool bar and threading die to effect operation of the latter.

HARRY P. TOWNSEND.

Copies of this patent may be obtained for five cents each, by addressing the "Commissioner of Patents, Washington, D. C."